United States Patent
Liu et al.

(10) Patent No.: US 6,823,087 B1
(45) Date of Patent: Nov. 23, 2004

(54) PARALLEL EDGE FILTERS IN VIDEO CODEC

(75) Inventors: Yi Liu, Austin, TX (US); Wei-Lien Hsu, Austin, TX (US); Frank Gorishek, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 609 days.

(21) Appl. No.: 09/855,871

(22) Filed: May 15, 2001

(51) Int. Cl.[7] .................................................. G06T 9/20
(52) U.S. Cl. ...................................... 382/266; 382/268
(58) Field of Search ................................. 382/266, 268

(56) References Cited

U.S. PATENT DOCUMENTS

| | | | | |
|---|---|---|---|---|
| 4,463,372 A | * | 7/1984 | Bennett et al. ............. 348/580 |
| 5,719,958 A | * | 2/1998 | Wober et al. ............... 382/199 |
| 5,796,875 A | * | 8/1998 | Read ........................... 382/261 |
| 5,832,135 A | * | 11/1998 | Merhav et al. ............. 382/260 |
| 6,002,801 A | | 12/1999 | Strongin et al. ............ 382/233 |
| 6,052,490 A | * | 4/2000 | Haskell et al. .............. 382/268 |
| 6,175,592 B1 | * | 1/2001 | Kim et al. .............. 375/240.16 |
| 6,175,892 B1 | * | 1/2001 | Sazzad et al. .............. 711/100 |
| 6,285,801 B1 | * | 9/2001 | Mancuso et al. ........... 382/268 |
| 6,389,177 B1 | * | 5/2002 | Chu et al. ................... 382/268 |
| 6,625,721 B1 | * | 9/2003 | Chen ........................... 712/10 |

* cited by examiner

Primary Examiner—Leo Boudreau
Assistant Examiner—Dennis Rosario-Vasquez
(74) Attorney, Agent, or Firm—Williams, Morgan & Amerson, P.C.

(57) ABSTRACT

The invention, in a first aspect, is a method for mitigating edge effects in a decompressed video image. The method comprises first reads an N×N group of pixels defining a vertical edge between two blocks in a video frame row by row into N registers, wherein N is a predetermined number defining the length of a filter. The content of the N registers is then transposed and then filtered in the filter. The filtered content of the N registers is then transposed and stored back from where it was read. In other aspects, the invention is a program storage device encoded with instructions that, when executed by a computer, perform such a method; a computer programmed to perform such a method; and a computing system capable of performing such a method.

50 Claims, 4 Drawing Sheets

PARALLEL EDGE FILTERS IN VIDEO CODEC

BACKGROUND OF THE INVENTION

1. Field of the Invention

The present invention pertains to video compression and decompression, and, more particularly, to a technique for mitigating edge "edge effects" in decompressing video data.

2. Description of the Related Art

In watching a video, the viewer is actually seeing a series of video images, or "frames," displayed in rapid succession. How rapid depends largely on geographic location because different locations use different standards with different numbers. In the United States, successive video images are displayed at a rate of 60 images per second. Each frame typically differs from the one before and the one after only very slightly. Thus, when the series is displayed rapidly enough, it creates the illusion of continued movement.

Each video image, however, contains a relatively large amount of information. This has caused problems with the advent of digital video systems. The digital video system breaks the image into pieces (called "pixels", or "picture elements"), transmits them, reassembles the pieces and displays the transmitted image. However, the amount of information that must be handled in the given time quickly overwhelms most digital electronics. Most digital electronics systems will take too long so that the successive images cannot be displayed quickly enough to create the illusion of continued motion. If the work is an audiovisual work so that it includes sound as well as imagery, the problem becomes particularly acute.

One solution employs video compression/decompression ("codec") techniques. There are "lossy" and "non-lossy" codec techniques. A lossy technique "loses" some information in the process of compressing and decompressing the information. For instance, lossy codec techniques take advantage of the fact that successive images will usually differ very little. Codec techniques quickly compare a frame with the frame image and then transmit only the differences instead of all the information. Standards setting bodies have defined standards for various codec techniques, but there are also many non-standard techniques. Each has advantages and disadvantages that impact performance differently.

One common problem with codec techniques are "edge effects." Technically, edge effects result in decompression from the quantization of what are known as the "discrete cosine-transformation" ("DCT") coefficients during compression. Referring now to FIG. 1, the video frame 100 is broken into a number of pixels 105. Pixels are usually handled in square blocks, such as the blocks 110. Each block 110 is defined by two horizontal edges and two vertical edges 115, 120 that will suffer from edge effects. More precisely, the pixels 105 lining the horizontal and vertical edges 115, 120 will suffer from "edge effects." Note that the number of pixels 105 and blocks 110 of pixels 105 are illustrative only, and are not intended to reflect the application of any particular standard.

Edge effects are mitigated by filtering the pixels 105 lining the horizontal and vertical edges 115, 120. "Horizontal" filters are applied to the horizontal edges 115 and "vertical" filters are applied to the vertical edges 120. Because of the way the data is organized when the information is stored to memory, the computation for the horizontal edges is manipulated to "parallelize." Parallelizing the computation is desirable because it decreases the time necessary to perform the computation. However, the data organization makes the vertical computation difficult to parallelize. Depending on the length of the filters employed, what requires a single memory access in the horizontal computation might take as many as four memory accesses in the vertical computation.

The present invention is directed to resolving, or at least reducing, one or all of the problems mentioned above.

SUMMARY OF THE INVENTION

The invention, in a first aspect, is a method for mitigating edge effects in a decompressed video image. The method comprises first reads an N×N group of pixels defining a vertical edge between two blocks in a video frame row by row into N registers, wherein N is a predetermined number defining the length of a filter. The content of the N registers is then transposed and then filtered in the filter. The filtered content of the N registers is then transposed and stored back from where it was read. In other aspects, the invention is a program storage device encoded with instructions that, when executed by a computer, perform such a method; a computer programmed to perform such a method; and a computing system capable of performing such a method.

BRIEF DESCRIPTION OF THE DRAWINGS

The invention may be understood by reference to the following description taken in conjunction with the accompanying drawings, in which like reference numerals identify like elements, and in which.

Figure 1:
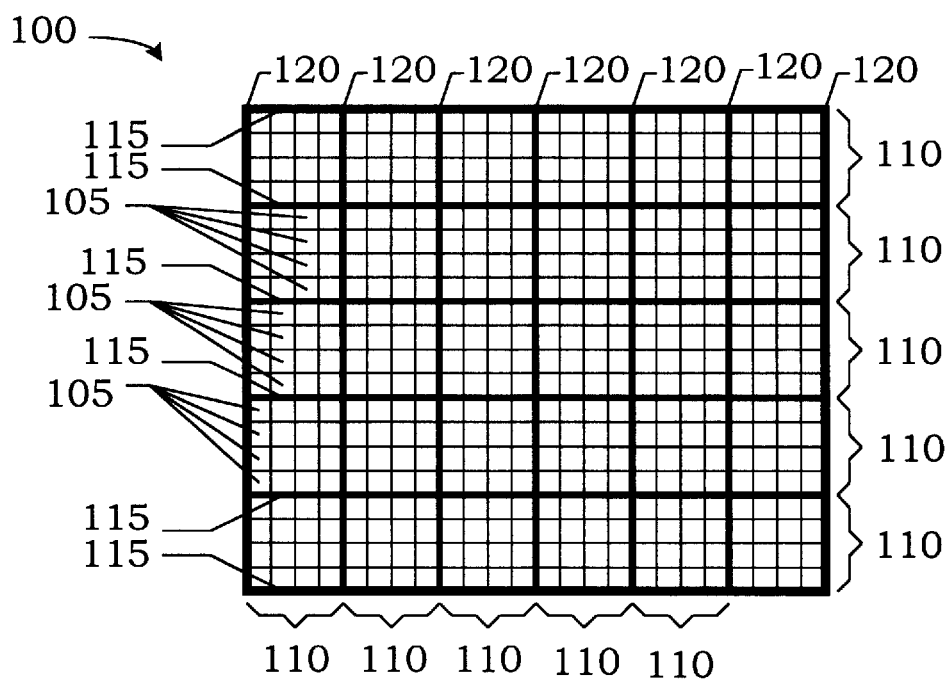
FIG. 1 conceptually illustrates a video frame and its constituent blocks of pixels.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
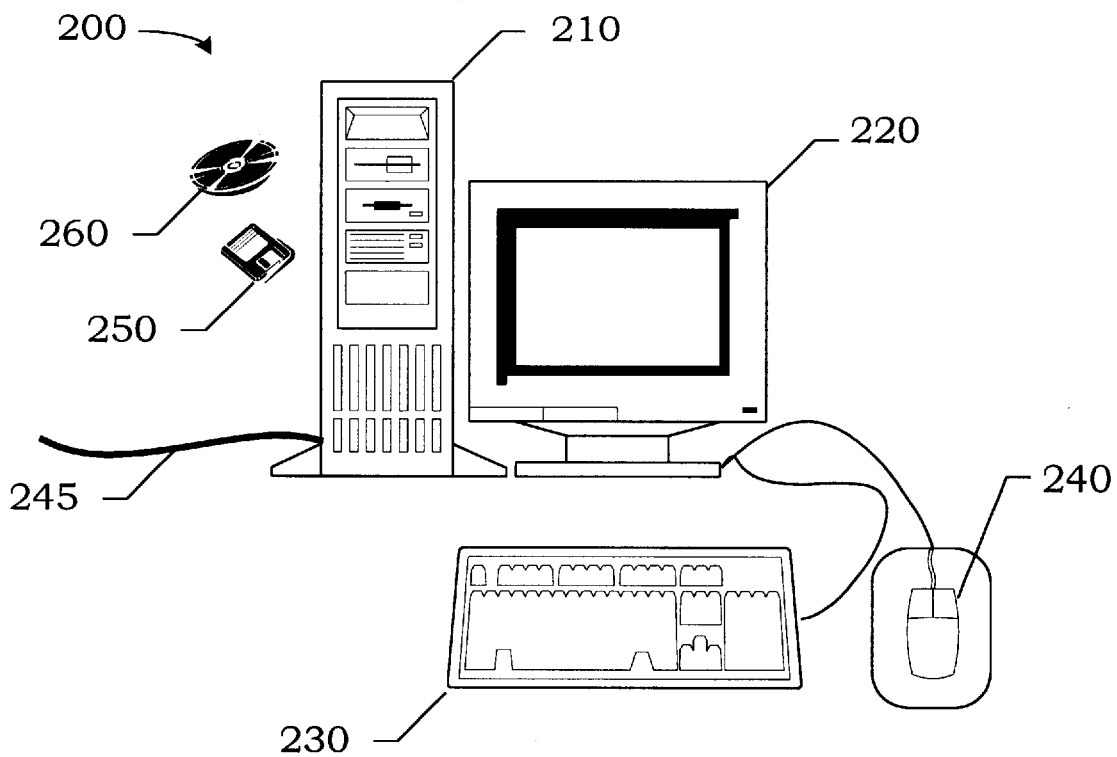
FIG. 2 depicts one particular computing device with which the present invention may be practiced.

Turning now to the drawings, FIG. 2 illustrates an electronic computing device 200 constructed and operated in accordance with the present invention. The computing device 200 is, in the illustrated embodiment, a stand-alone personal computer. Alternative embodiments, however, may employ other types of computing devices including, but not limited to, laptop computers, workstations, mini-computers, and mainframe computers. The computing device 200 includes a processor unit 210, a display 220, a keyboard 230, and a mouse 240. The computing device 200 may also be connected through a connection 245 to a larger computing system (not shown), such as a local area network ("LAN"), a wide area network ("WAN"), a System or Storage Area Network ("SAN") an "intranet," an enterprise computing system, or even the Internet.

Figure 3:
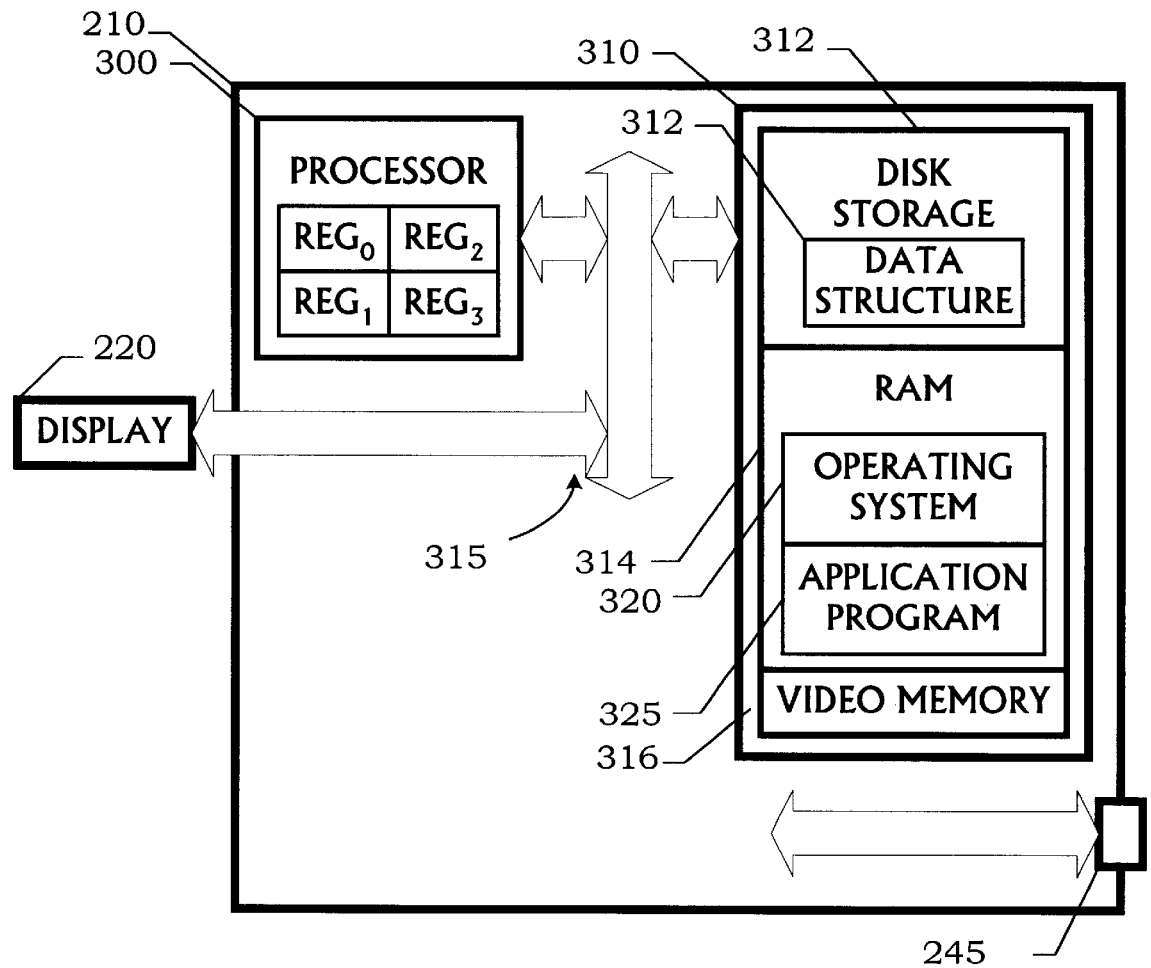
FIG. 3 is a partial functional block diagram of the computing device of FIG. 2.

FIG. 3 is a partial, functional block diagram of the computing device 200 in FIG. 2. The processor unit 210 houses a processor 300, which includes at least four registers $REG_0$–$REG_3$. The processor 300 may be implemented using any of a variety of processors such as:

a general purpose microprocessor, e.g., Advanced Micro Device's K7®, Athlon®, and Duron® processors;

a digital signal processor; or a graphics co-processor.

Still other types of processors may be employed. The processor around which the computing device 200 is built is not material to the practice of the invention provided it is capable of supporting the method of the present invention, as is discussed further below. One particular embodiment of the present invention uses an x86 compatible processor implementing Multi-Media eXtension ("MMX") capabilities. In this particular embodiment, the registers are MMX registers.

A memory subsystem 310 includes, inter alia, some disk storage 312, some random access memory ("RAM") 314, and some video memory 316. These memory components may be implemented using any suitable technique known to the art. The disk storage 312 will, for example, typically be a hard drive of the computing device 200, but may alternatively be a removable disk such as a magnetic floppy disk 250 or an optical disk 260, which is a compact disk, read only memory ("CDROM") in the illustrated embodiment. The RAM 314 will typically be implemented in dynamic random access memory ("DRAM"), but other techniques such as static random access memory ("SRAM") may be used. The VRAM 316 is a special-purpose memory used expressly for processing video data and can be implemented using any known technique, such as video RAM ("VRAM"), Windows RAM ("WRAM"), Rambus DRAM ("RDRAM"), SyncLink DRAM ("SLDRAM"), or Synchronous Graphic RAM ("SGRAM"). Note that not all embodiments of the present invention will employ the video memory 316.

The processor 300, the memory subsystem 310, and the display 220 communicate over a bus system 315. The bus system 315 may also be implemented using conventional techniques known to the art. Thus, the protocols and standards employed will be implementation specific. In some embodiments, the bus system 315 may include an Accelerated Graphics Port ("AGP") (not shown).

The processor 300 under the direction of an implementation specific operating system ("OS") 320 loaded into the RAM 314 when the computing device 200 is booted executes an application program 325. The application program 325 is shown loaded into the RAM 314, but the situs of the application program 325 is not important. It may executed directly from the disk storage 312 or even from another machine (not shown) interfaced with the computing device 200 over the connection 245. The application program 325 will typically be a video application, such as a video player, video conferencing, or video authoring program. However, this is not necessary to the practice of the invention. The invention may be practiced in any application program having a need or opportunity to process compressed data.

The application program 325 implements in software a method for mitigating edge effects in a decompressed video image discussed more fully below. Thus, some portions of the detailed descriptions herein are consequently presented in terms of a software implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the invention manifests itself in several ways. In one aspect, the invention includes a method for mitigating edge effects in a decompressed video image. In another aspect, the invention includes a plurality of instructions encoded on a program storage medium (e.g., the RAM 314) that, when executed by a computer (e.g., the processor 300), perform such a method. The program storage medium may be magnetic (e.g., the floppy disk 250) or optical (e.g., the optical disk 260). The program storage medium may also be random access (e.g., the RAM 314, the floppy disk 250) or read-only (e.g., the optical disk 260). The invention is not limited by the nature of the program storage medium on which the instructions are encoded. In yet another aspect, the invention includes a computing device (e.g., the computing device 200) programmed to perform such a method.

Figure 4:
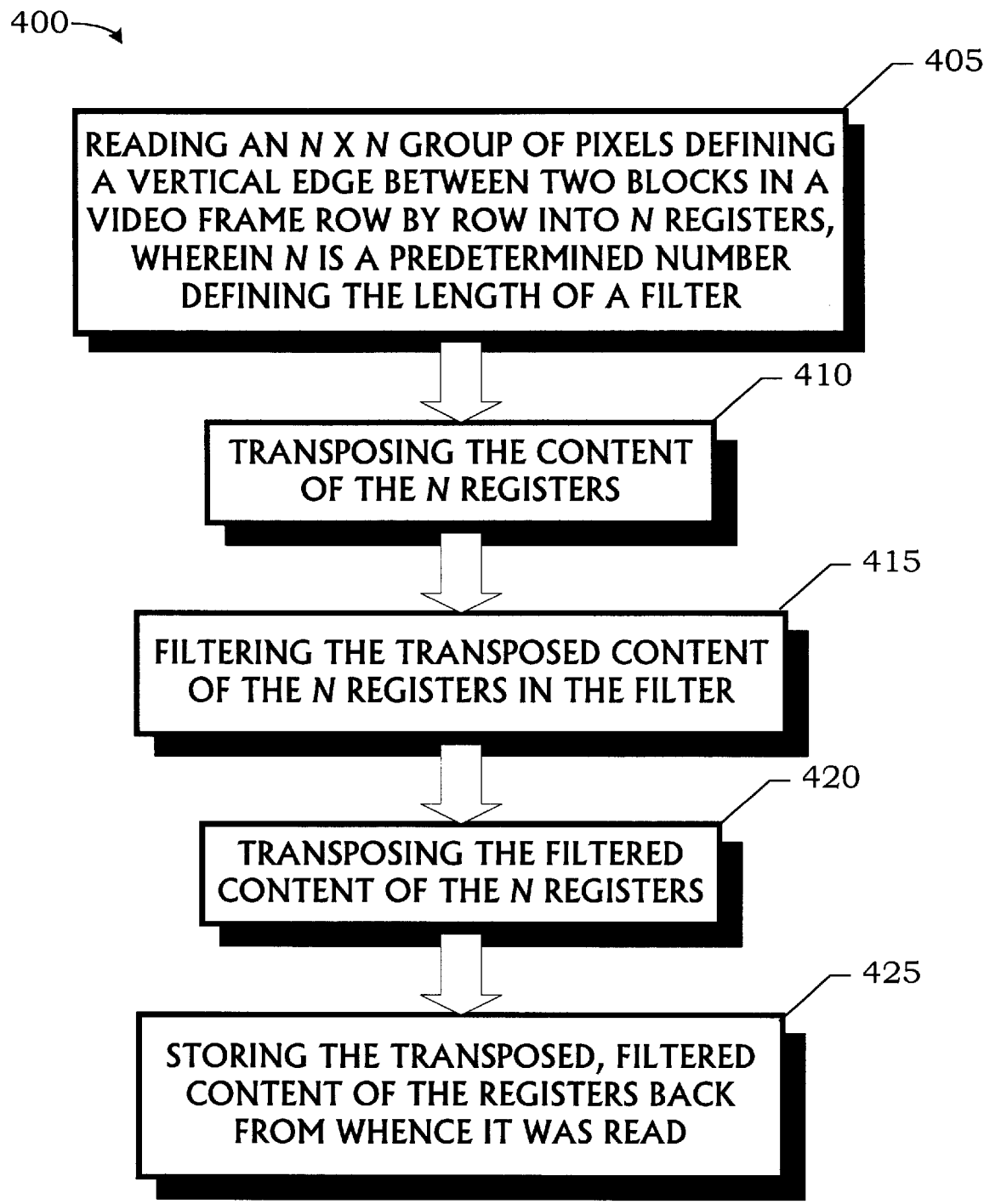
FIG. 4 illustrates a method for mitigating edge effects practiced in accordance with the present invention.

FIG. 4 illustrates a method 400 for mitigating edge effects in a decompressed video image. The method 400 mitigates edge effects in a plurality of pixels defining a vertical edge of a frame. The method 400 may be employed in conjunction with conventional techniques for mitigating edge effects in pixels defining a horizontal edge. One particular embodiment of the method 400 will be discussed further below in connection with FIG. 5 and FIG. 6.

Returning to FIG. 4, the method 400 begins by reading an N×N group of pixels defining a vertical edge between two blocks in a video frame row by row into N registers, wherein N is a predetermined number defining the length of a filter, as set forth in the box 405. Next, the method 400 transposes the content of the N registers, as set forth in the box 410. The method 400 then filters the transposed content of the N registers in the filter, as set forth in the box 415. Then, as set forth in the box 420, the method 400 transposes the filtered content of the N registers. Finally, the method 400 stores the transposed, filtered content of the registers back from whence it was read, as set forth in the box 425.

Figure 5:
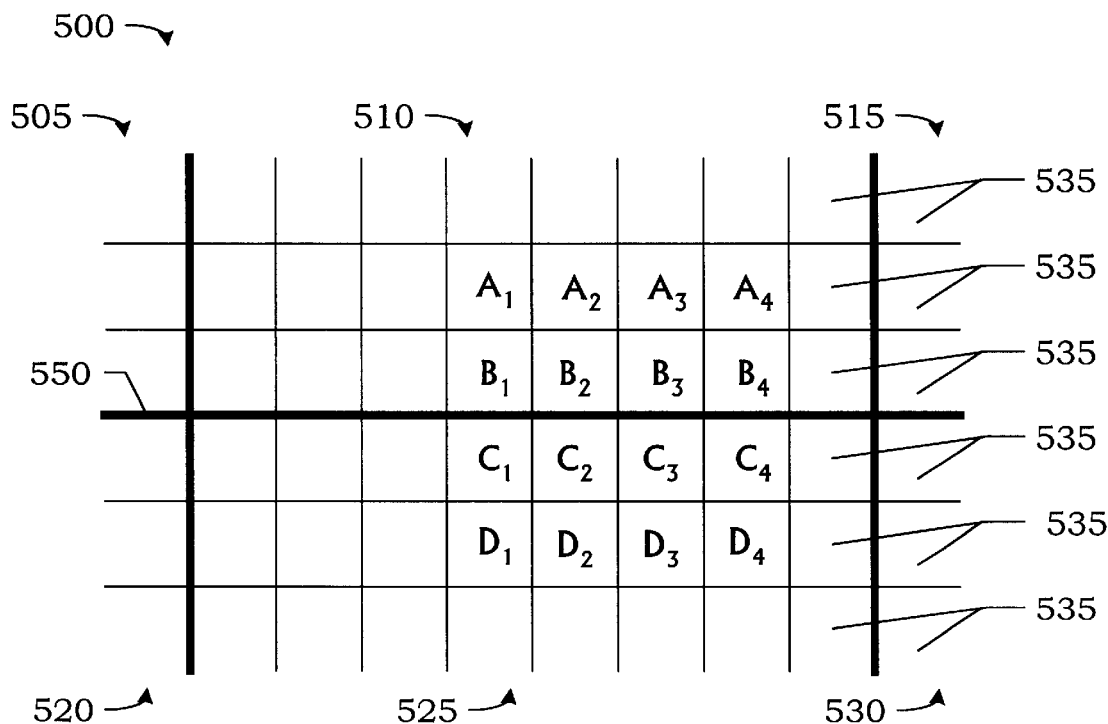
FIG. 5 illustrates a horizontal filtering technique.
Figure 6:
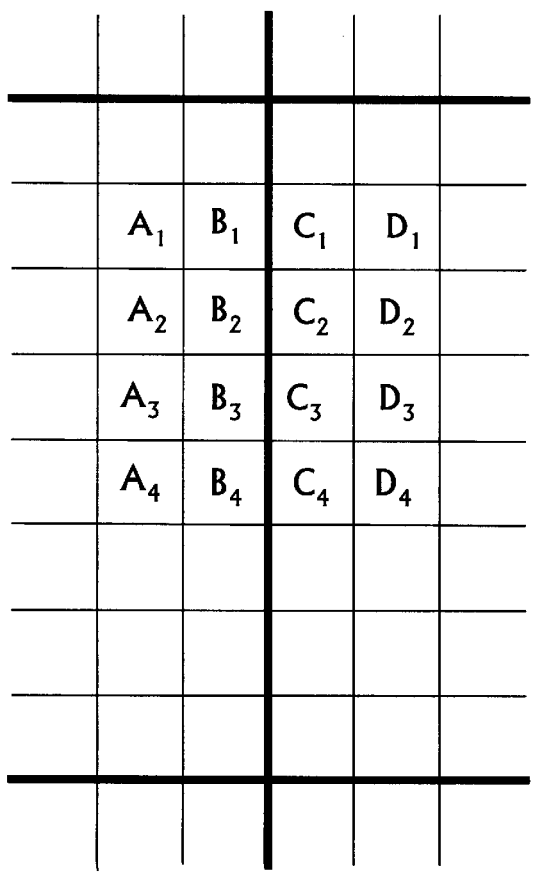
FIG. 6 illustrates a vertical filtering technique in accordance with the present invention.

One particular embodiment of the present invention will now be disclosed in relation to FIG. 5 and FIG. 6. FIG. 5 illustrates a portion 500 of a video frame not otherwise shown. The portion 500 includes parts of six blocks 505, 510, 515, 520, 525, 530, each of which comprises an 8×8 block of pixels 535. Note that the number of pixels 535 in each block 505, 510, 515, 520, 525, 530 is not material to the practice of the invention. Similarly, the number of blocks 505, 510, 515, 520, 525, 530 in the frame is not material to the practice of the invention.

In this particular embodiment, the processor 300 in FIG. 3 is implemented with an Athlon™ processor commercially available from Advanced Micro Devices, Inc. The Athlon™ is an x86 compatible processor with MMX capabilities. Thus, the registers $REG_0$–$REG_3$ are MMX registers and will be referred to accordingly. The Athlon™ employs 3DNow! graphics instructions as are known in the art and a standard H263v2 filter for filtering pixels to mitigate edge effects. The filter length for an H263v2 filter is four, so N=4 in this particular embodiment. Note that some alternative embodiments might employ Streaming Single Instruction, Multiple Data ("SIMD") Extension ("SSE") 2 ("SSE2") instructions.

Consider now one iteration of technique involving pixels $A_1$–$A_4$, $B_1$–$B_4$, $C_1$–$C_4$, and $D_1$–$D_4$ defining a portion of the horizontal edge 550 shown in FIG. 5. Note that both the horizontal and vertical techniques should be iterated for all pixels 535 for each of the blocks 505–530. In this horizontal case, four memory reads will capture all pixel values needed, assuming a 16-bit integer type. The four memory reads will then yield contents for the registers $MM_0$, $MM_1$, $MM_2$, $MM_3$ as follows:

$MM_0=A_1A_2A_3A_4$
$MM_1=B_1B_2\ B_3\ B_4$
$MM_3=D_1D_2\ D_3D_4$

The filtering operations using the H263v2 filter and conventional techniques can then be easily performed in parallel with data in the registers $MM_0$–$MM_3$.

In the vertical edge case, processing the edge pixels in parallel is not straightforward using conventional techniques because the data is stored in the order of rows in memory. Thus, the present invention employs one particular embodiment of the method 400 in FIG. 4 to process the pixels 535 in this case. More particular, in this particular embodiment, the technique begins by reading in four pixels each row along the vertical edge. For example, four memory reading may store the data as follows:

$MM_0=A_1B_1C_1D_1$
$MM=A_2B_2C_2D_2$
$MM_2=A_3B_3C_3D_3$
$MM_3=A_4B_4C_4D_4$

Next, the technique performs a transposition operation for the data in the registers $MM_0$–$MM_3$. That means, after transposition the MMX registers $MM_0$–$MM_3$, the stored data is as follows:

$MM_0=A_1A_2A_3A_4$
$MM_1=B_1B_2B_3B_4$
$MM_2=C_1C_2C_3C_4$
$MM_3=D_1D_2D_3D_4$

Once the transposition is performed, the content of the MMX registers $MM_0$–$MM_3$ is then filtered using the H263v2 filter to filter the edge pixels in parallel. The content of the MMX registers $MM_0$–$MM_3$ is then transposed again, and the data stored back from whence it was read.

If the MMX registers $MM_0$–$MM_3$ initially store the data as set forth above, i.e.:

$MM_0=A_1B_1C_1D_1$
$MM_1=A_2B_2C_2D_2$
$MM_2=A_3B_3C_3D_3$
$MM_3=A_4B_4C_4D_4$ then a fast transposition algorithm is proposed as follows:

| | | |
|---|---|---|
| MOVQ | $MM_4$, $MM_3$ | ;Copy $MM_3$ to $MM_4$ |
| MOVQ | $MM_5$, $MM_1$ | ;Copy $MM_1$ to $MM_5$ |
| PUNPCKLWD | $MM_1$, $MM_0$ | ;$MM_1 = C_1C_2D_1D_2$ |
| PUNPCKHWD | $MM_5$, $MM_0$ | ;$MM_5 = A_1A_2B_1B_2$ |
| PUNPCKHWD | $MM_4$, $MM_2$ | ;$MM_4 = A_3A_4B_3B_4$ |
| PUNPCKLWD | $MM_3$, $MM_2$ | ;$MM_3 = C_3C_4D_3D_4$ |
| MOVQ | $MM_0$, $MM_4$ | ;Copy $MM_4$ to $MM_0$ |
| MOVQ | $MM_2$, $MM_3$ | ;Copy $MM_3$ to $MM_2$ |
| PUNPCKHDQ | $MM_0$, $MM_5$ | ;$MM_0 = A_1A_2A_3A_4$ |
| PUNPCKLDQ | $MM_4$, $MM_5$ | ;$MM4 = B_1B_2B_3B_4$ |
| PUNPCKHDQ | $MM_2$, $MM_1$ | ;$MM_2 = C_1C_2C_3C_4$ |
| PUNPCKLDQ | $MM_3$, $MM_1$ | ;$MM_3 = D_1D_2D_3D_4$ |

Note that this transposition algorithm employs two additional MMX registers $MM_4$, $MM_5$.

This transposition procedure only takes, at most, 6 cycles for the Athlon™ and other processors commercially available from Advanced Micro Devices, Inc. Put the two transpositions together and the new approach introduces total of 12 cycles extra. But it saves 4 loops, each of which would take about 30 cycles for the typical filter operation in the H263v2 filter. So, the new approach will be very efficient if a loop takes more than 12 cycles and runs more than four times. However, alternative embodiments may employ other transposition algorithms.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for mitigating edge effects in a decompressed video image, the method comprising:

reading an N×N group of pixels defining a vertical edge between two blocks in a video frame row by row into N registers, wherein N is a predetermined number defining the length of a filter;

transposing the content of the N registers;

filtering the transposed content of the N registers in the filter;

transposing the filtered content of the N registers; and storing the transposed, filtered content of the registers back from whence it was read.

2. The method of claim 1, wherein the method is implemented in MMX or SSE2 instructions.

3. The method of claim 1, wherein reading the N×N group of pixels includes reading a 4×4 group of pixels.

4. The method of claim 3, wherein reading the 4×4 group of pixels defining the vertical edge between two blocks in the video frame row by row into N registers includes reading the pixels into 4 registers.

5. The method of claim 1, wherein reading then N×N group of pixels defining the vertical edge between two blocks in the video frame row by row into N registers includes reading the pixels into 4 registers.

6. The method of claim 1, wherein transposing the content of the N registers includes performing the following algorithm:

| | |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

7. The method of claim 1, wherein filtering the transposed content of the N registers in the filter includes filtering the transposed content of the N registers in an H263v2 filter.

8. The method of claim 1, wherein transposing the filtered content of the N registers includes performing the following algorithm:

| | |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

9. A program storage medium encoded with instructions that, when executed by a computer, perform a method for mitigating edge effects in a decompressed video image, the method comprising:

reading an N×N group of pixels defining a vertical edge between two blocks in a video frame row by row into N registers, wherein N is a predetermined number defining the length of a filter;

transposing the content of the N registers;

filtering the transposed content of the N registers in the filter;

transposing the filtered content of the N registers; and storing the transposed, filtered content of the registers back from whence it was read.

10. The program storage medium of claim 9, wherein the encoded method is implemented in MMX or SSE2 instructions.

11. The program storage medium of claim 9, wherein reading the N×N group of pixels in the encoded method includes reading a 4×4 group of pixels.

12. The program storage medium of claim 11, wherein reading the 4×4 group of pixels defining the vertical edge between two blocks in the video frame row by row into N registers in the encoded method includes reading the pixels into 4 registers.

13. The program storage medium of claim 9, wherein reading then N×N group of pixels defining the vertical edge between two blocks in the video frame row by row into N registers in the encoded method includes reading the pixels into 4 registers.

14. The program storage medium of claim 9, wherein transposing the content of the N registers in the encoded method includes performing the following algorithm:

| | |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

15. The program storage medium of claim 9, wherein filtering the transposed content of the N registers in the filter in the encoded method includes filtering the transposed content of the N registers in an H263v2 filter.

16. The program storage medium of claim 9, wherein transposing the filtered content of the N registers in the encoded method includes performing the following algorithm:

| | |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

17. The program storage device of claim 9, wherein the program storage device is selected from the group consisting of a magnetic program storage device and an optical program storage device.

18. The program storage device of claim 17, wherein the selected program storage device is the magnetic program storage device and is a hard disk, a removable disk, or a RAM device.

19. The program storage device of claim 17, wherein the selected program storage device is the optical storage device and is a CD-ROM.

20. The program storage device of claim 9, wherein the program storage device is read-only or random access.

21. A computing device with a computer program embodied in a computer readable medium for performing a method of mitigating edge effects in a decompressed video image, the method comprising:

reading an N×N group of pixels defining a vertical edge between two blocks in a video frame row by row into N registers, wherein N is a predetermined number defining the length of a filter;

transposing the content of the N registers;

filtering the transposed content of the N registers in the filter;

transposing the filtered content of the N registers; and storing the transposed, filtered content of the registers back from whence it was read.

22. The programmed computing device of claim 21, wherein the programmed method is implemented in MMX or SSE2 instructions.

23. The programmed computing device of claim 21, wherein reading the N×N group of pixels in the programmed method includes reading a 4×4 group of pixels.

24. The programmed computing device of claim 23, wherein reading the 4×4 group of pixels defining the vertical edge between two blocks in the video frame row by row into N registers in the programmed method includes reading the pixels into 4 registers.

25. The programmed computing device of claim 21, wherein reading then N×N group of pixels defining the vertical edge between two blocks in the video frame row by row into N registers in the programmed method includes reading the pixels into 4 registers.

26. The programmed computing device of claim 21, wherein transposing the content of the N registers in the programmed method includes performing the following algorithm:

| | |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

27. The programmed computing device of claim 21, wherein filtering the transposed content of the N registers in the filter in the programmed method includes filtering the transposed content of the N registers in an H263v2 filter.

28. The programmed computing device of claim 21, wherein transposing the filtered content of the N registers in the programmed method includes performing the following algorithm:

| | |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

29. The programmed computing device of claim 21, wherein the programmed computing device includes a data structure encoded on a program storage medium and reading the N×N group of pixels includes reading the N×N group of pixels from the data structure.

30. The programmed computing device of claim 29, wherein the program storage medium comprises a magnetic program storage device.

31. The programmed computing device of claim 30, wherein the magnetic program storage medium comprises a hard disk, a removable disk, or a RAM device.

32. The programmed computing device of claim 21, wherein the N registers are MMX registers.

33. A computing system, comprising:

a processor;

a first program storage device encoded with instructions that, when executed by the processor, perform a method for mitigating edge effects in a decompressed video image, the method comprising:

reading an N×N group of pixels defining a vertical edge between two blocks in a video frame row by row into N registers, wherein N is a predetermined number defining the length of a filter;

transposing the content of the N registers;

filtering the transposed content of the N registers in the filter;

transposing the filtered content of the N registers; and storing the transposed, filtered content of the registers back from whence it was read;

a second program storage device encoded with a data structure comprising video data from which the N×N group of pixels is read and to which the transposed, filtered content is stored.

34. The computing system of claim 33, wherein the encoded method is implemented in MMX or SSE2 instructions.

35. The computing system of claim 33, wherein reading the N×N group of pixels in the encoded method includes reading a 4×4 group of pixels.

36. The computing system of claim 35, wherein reading the 4×4 group of pixels defining the vertical edge between two blocks in the video frame row by row into N registers in the encoded method includes reading the pixels into 4 registers.

37. The computing system of claim 33, wherein reading then N×N group of pixels defining the vertical edge between two blocks in the video frame row by row into N registers in the encoded method includes reading the pixels into 4 registers.

38. The computing system of claim 33, wherein transposing the content of the N registers in the encoded method includes performing the following algorithm:

| | |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

39. The computing system of claim 33, wherein filtering the transposed content of the N registers in the filter in the encoded method includes filtering the transposed content of the N registers in an H263v2 filter.

40. The computing system of claim 33, wherein transposing the filtered content of the N registers in the encoded method includes performing the following algorithm:

|  |  |
|---|---|
| MOVQ | $MM_4, MM_3$ |
| MOVQ | $MM_5, MM_1$ |
| PUNPCKLWD | $MM_1, MM_0$ |
| PUNPCKHWD | $MM_5, MM_0$ |
| PUNPCKHWD | $MM_4, MM_2$ |
| PUNPCKLWD | $MM_3, MM_2$ |
| MOVQ | $MM_0, MM_4$ |
| MOVQ | $MM_2, MM_3$ |
| PUNPCKHDQ | $MM_0, MM_5$ |
| PUNPCKLDQ | $MM_4, MM_5$ |
| PUNPCKHDQ | $MM_2, MM_1$ |
| PUNPCKLDQ | $MM_3, MM_1$. |

41. The computing system of claim 33, wherein the first program storage device is selected from the group consisting of a magnetic program storage device and an optical program storage device.

42. The computing system of claim 41, wherein the selected program storage device is the magnetic program storage device and is a hard disk, a removable disk, or a RAM device.

43. The computing system of claim 41, wherein the selected program storage device is the optical storage device and is a CD-ROM.

44. The computing system of claim 33, wherein the first program storage device is read-only or random access.

45. The computing system of claim 44, wherein the program storage medium comprises a magnetic program storage device.

46. The computing system of claim 45, wherein the magnetic program storage medium comprises a hard disk, a removable disk, or a RAM device.

47. The computing system of claim 33, wherein the N registers are MMX registers.

48. The computing system of claim 33, wherein the processor is selected from the group consisting of a microprocessor, a digital signal processor, and a graphics co-processor.

49. The computing system of claim 48, wherein the selected processor is the microprocessor and the microprocessor comprises an x86 compatible microprocessor with MMX capabilities.

50. The computing system of claim 48, wherein the x86 compatible microprocessor with MMX capabilities is the Athlon™ processor.

* * * * *